Jan. 21, 1969   J. J. HUNTER ET AL   3,422,856
PLASTIC-LINED PIPE AND METHOD OF PRODUCING
Filed April 11, 1967   Sheet 1 of 4
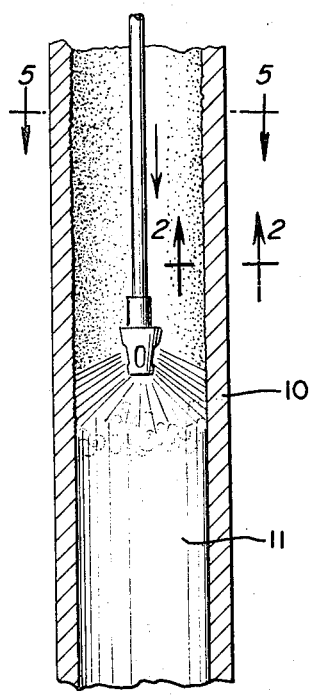
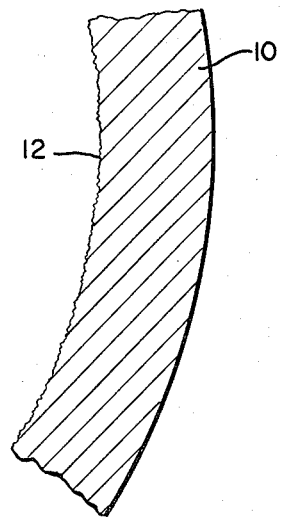
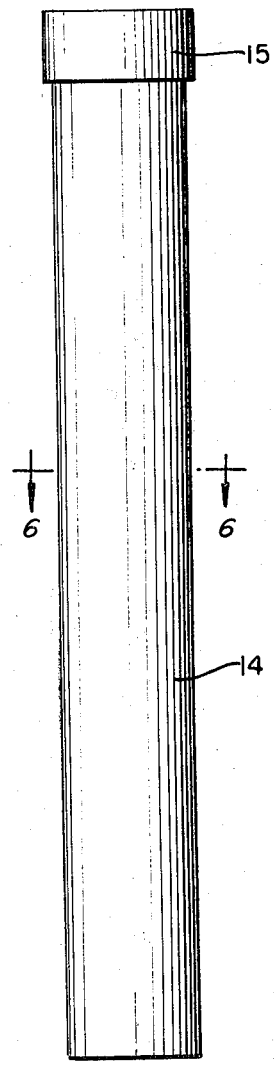
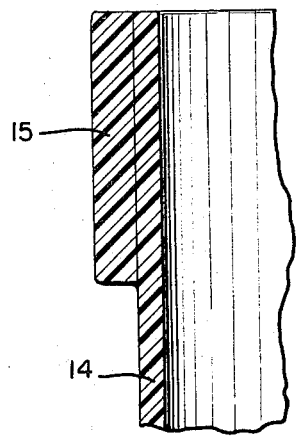
INVENTOR
JOHN J. HUNTER
KNOLIE L. FENNER, Jr.
BY
ATTORNEY

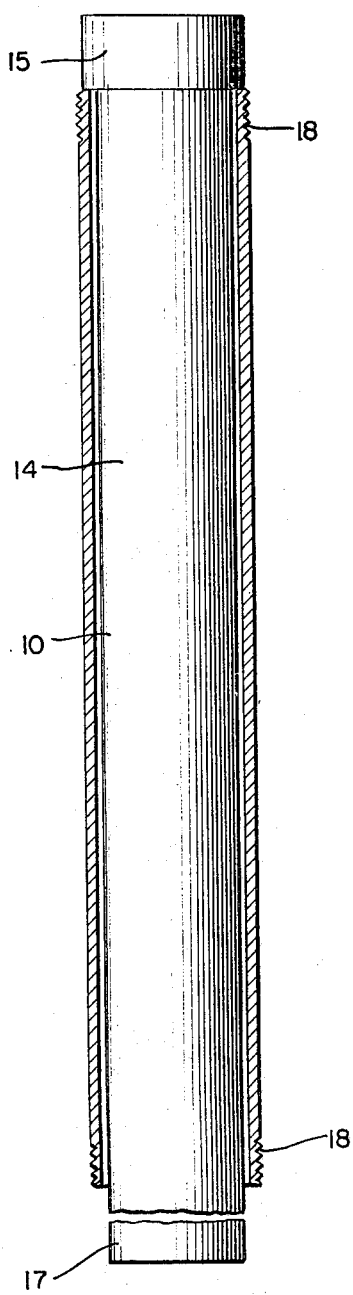
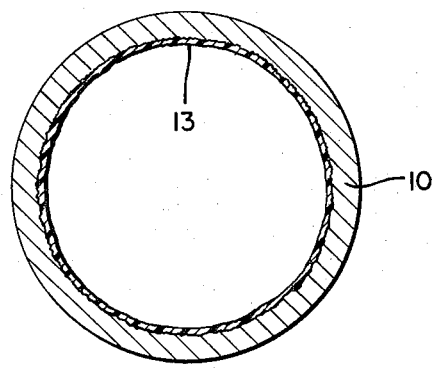
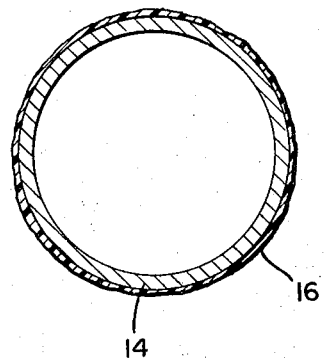

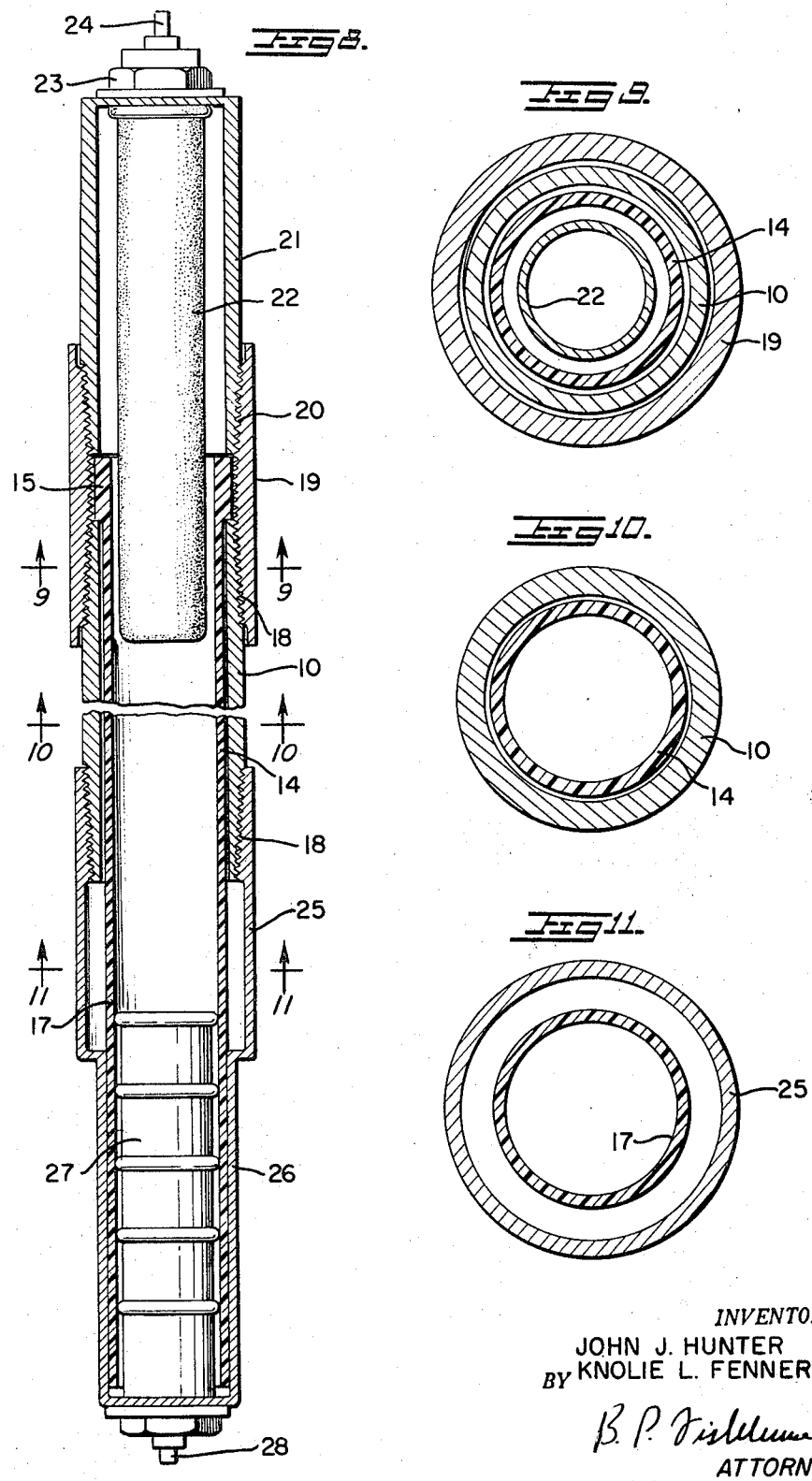

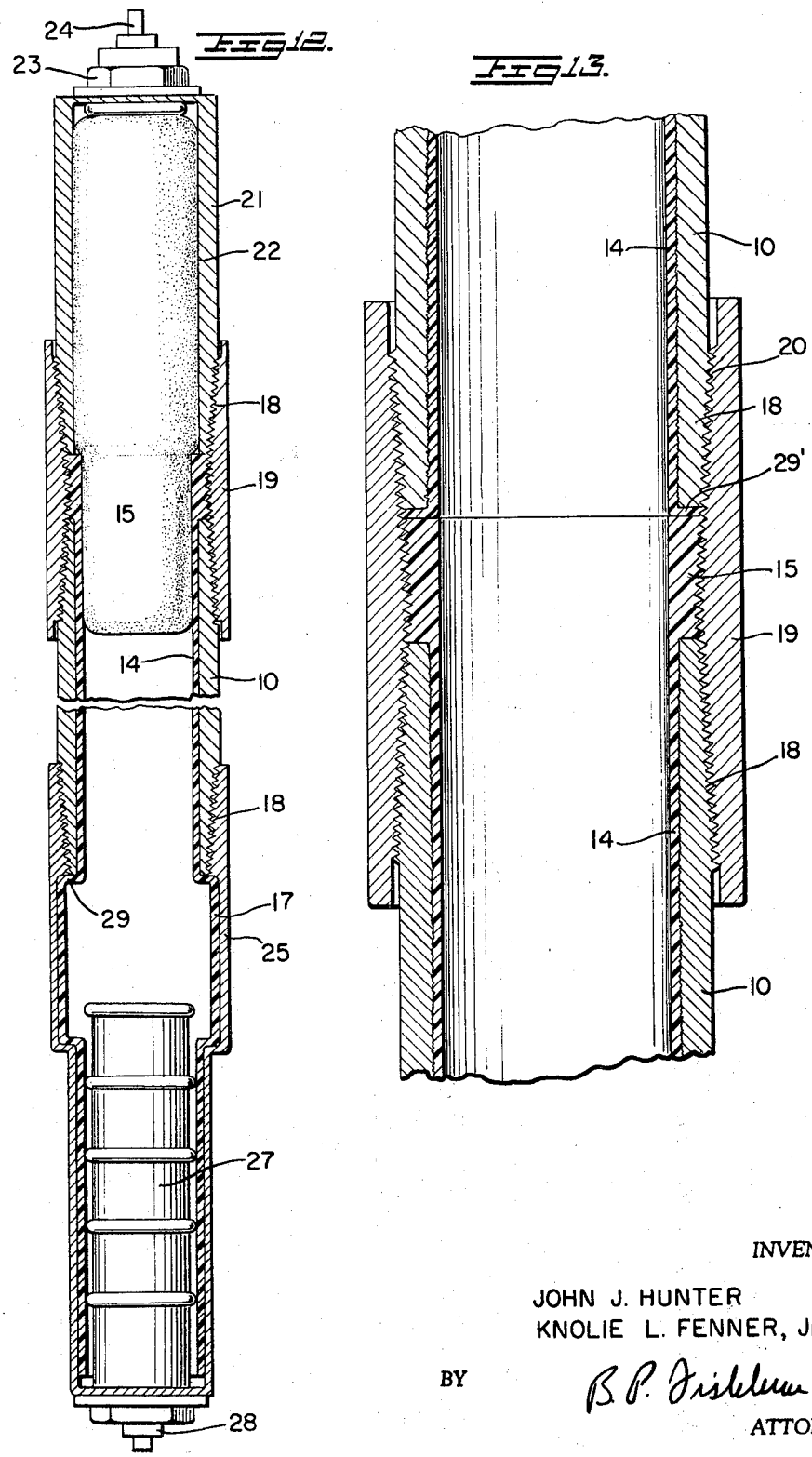

United States Patent Office 3,422,856
Patented Jan. 21, 1969

3,422,856
PLASTIC-LINED PIPE AND METHOD
OF PRODUCING
John J. Hunter, 1938 Westview, and Knolie L. Fenner, Jr.,
3816 N. 11th St., both of Abilene, Tex. 79603
Filed Apr. 11, 1967, Ser. No. 630,057
U.S. Cl. 138—143 8 Claims
Int. Cl. F16l 9/12, 9/14

ABSTRACT OF THE DISCLOSURE

A conduit or pipe for corrosive liquids and the like which has a preformed thermoplastic liner firmly and permanently adhesively bonded throughout its entire length to an outer reinforcing pipe body. The conduit is characterized by a smooth uninterrupted bore of constant diameter even at the coupling joints between sections thereof. The arrangement permits positive sealing at the joints while using standard tapered pipe threads for the coupling. A simplified method of producing the plastic-lined pipe is disclosed.

BACKGROUND OF THE INVENTION

The invention is directed to that class of conduit or pipe commonly used in industry for handling salt water, acids, caustics and other corrosive fluids which could not be handled in ordinary metal piping without a protective lining.

The prior art contains a number of teachings pertaining to conduits for this purpose and to methods of making conduits but it is well known in the art that no completely satisfactory conduit has been devised.

One known method involves spraying of a plastic in liquid form into the bore of a steel pipe to coat the bore and render it corrosion-resistant. It is very difficult to coat the long pipe bore uniformly and without gaps in the coating and to have the coating sufficiently thick to stand up under the abrasive action of some fluids and slurries. Also, coating methods result in a non-uniform internal pipe diameter at the pipe joints or couplings and this causes turbulence and resistance to flow.

Another known method is to employ plastic tube lengths which are fused together in lengths and inserted in metallic pipes bodily. The inside diameter of the pipe is greatly reduced and consequently the flow capacity is reduced, rendering the arrangement costly and inefficient. Also, there is a space between the plastic tube and metal pipe bore leaving the liner inadequately supported by the metal pipe. A leak at any point along the unsupported liner will effect a substantial length of the conduit.

Another method employs a vacuum extruded plastic liner wherein the liner is placed in a metal tube or pipe and sealed thereto at the ends only but the use of metallic bands. There is no cementing or bonding, and the liner is unsupported except at its ends. The liner tends to sag at elevated temperatures and is effected adversely by surging pressures of the fluid in the conduit. The life of the liner is dependent upon the metallic bands and there are serious problems of sealing adequately at the coupling joints.

SUMMARY OF THE INVENTION

According to the present invention, the above prior art deficiencies and problems are fully overcome by a simplified and efficient method of producing plastic-lined pipe or tubing suitable for handling corrosive liquids without turbulence or excessive resistance to flow and without the problems of leakage through the wall of the lining or at the pipe joints. Standard tapered pipe threads may be employed at the pipe couplings and no costly special machine operations are required. The actual pipe coupling sleeve is employed as a part of the mold structure in the process and does not have to be removed from the female end of the pipe with which it is associated in the manufacturing process. Additional advantages of the invention are the following:

(1) The extruded thermoplastic bonded pipe lining of the invention significantly increases the pressure-holding capacity of the composite conduit up to as much as 20% above steel pipe without a lining;

(2) Because of the bond produced by the use of thermal-type epoxy cement between the plastic liner and outer pipe body, there can never be any movement of the liner as a result of differential shrink or expansion coefficients and there can be no corrosion between the liner and metal pipe in the unlikely event of a leak at a pipe joint or at a localized point in the liner. The actual liner will not and cannot leak unless it is directly gouged or cut in some severe manner, unlikely to occur in practice;

(3) The invention structure has a smooth continuous bore even at the coupling joints and the plastic lining is of constant thickness throughout the conduit. A thickened portion of the lining at each joint in the conduit assures positive sealing and allows the use of standard tapered screw threads. Turbulence and resistance to flow at the joints are eliminated;

(4) During handling of conduit sections, it is only necessary to protect the ends of the conduits from damage, as compared to the more difficult handling problems which arise in connection with coated linings and unbonded plastic inserts or tubes, the latter types being much more delicate; and (5) The use of a thermoplastic lining in conjunction with thermal epoxy cement in accordance with the method insures complete 100% bonding between the liner and pipe. Frictional resistance to flow is held to the absolute minimum and the smallest possible overall pipe size may be used for particular flow requirements.

According to the present invention, after suitable preparation of the external metal pipe, the bore of this pipe and the periphery of the extruded thermoplastic liner are coated with thermal-type epoxy cement and the cement is allowed to dry. The liner is then introduced into the outer pipe and suitable pressure retaining mold element is allowed to dry. The liner is then introduced into section being processed. The conduit is then heated and internal pressure is applied to the bore of the liner and maintained until a thermoplastic material and the epoxy cement coact to produce the desired bond with the metal pipe. The internal pressure is maintained while the composite structure is cooled to cure and harden the bond. The pressure is relieved and the excess liner material is trimmed from the male end of the conduit. The pressurizing process forms an annular flange around the male end of the conduit to allow sealing when abutted with an adjacent female end. The pipe coupling sleeve employed at each pipe joint constitutes a part of the mold and need never be removed from the female end of the conduit after the molding operation. The molding operation also serves to bond the thickened end portion of the female end to the threaded coupling member.

BRIEF DESCRIPTION OF THE DRAWINGS

FIGURE 1 is a fragmentary longitudinal section through a metal outer pipe showing the bore of such pipe being sandblasted;

FIGURE 2 is a greatly enlarged circumferential segment of the pipe bore in cross section showing the effect of sandblasting, taken on line 2—2 of FIGURE 1;

FIGURE 3 is a side elevation of a plastic liner utilized in the invention;

FIGURE 4 is an enlarged fragmentary longitudinal vertical section through the liner and showing a thickened collar portion on one end thereof;

FIGURE 5 is a transverse section taken on line 5—5 of FIGURE 1 and showing epoxy cement applied to the bore of the metal pipe;

FIGURE 6 is a similar section taken on line 6—6 of FIGURE 3 and showing epoxy cement applied to the outer surface of the liner;

FIGURE 7 is an assembled view of the liner and outer pipe prior to the bonding operation;

FIGURE 8 is a longitudinal sectional view showing a section of pipe and liner in association with molding and inflating means employed in the bonding operation;

FIGURE 9 is a transverse section taken on line 9—9 of FIGURE 8;

FIGURE 10 is a similar section taken on line 10—10 of FIGURE 8;

FIGURE 11 is a similar section taken on line 11—11 of FIGURE 8;

FIGURE 12 is a sectional view, similar to FIGURE 8, illustrating the pressurizing and molding of the liner in the bonding process; and FIGURE 13 is an enlarged fragmentary central longitudinal section through a conduit joint made in accordance with the invention.

DESCRIPTION OF THE PREFERRED EMBODIMENT

Referring to the drawings, wherein like numerals designate like parts, the numeral 10, FIGURE 1, designates a section of steel pipe or the like which is to form the outside reinforcing body of the lined pipe or conduit made in accordance with the invention. In FIGURE 1, the bore 11 of the pipe 10 is being sandblasted throughout the entire length of the bore to provide a slightly roughened or pitted surface as indicated at 12 in FIGURE 2. This roughened surface will produce a stronger bond with the adhesive agent employed in the method. Prior to sandblasting, the pipe 10 is preferably subjected to a vibrating or rattling operation to remove all loose scale, rust and the like. Also, before sandblasting, the pipe 10 is preferably placed in an oven for approximately one hour and heated to about 750° F. to remove gases from the pores of the pipe.

Following the sandblasting step, FIGURE 5, the bore of the pipe 10 is thoroughly coated with thermal-type epoxy cement, such as AP-1000 Resin Adhesive or some other suitable plastic-to-metal bonding agent. The bore of the pipe is coated with epoxy cement by passing a gun, not shown, through the bore while spraying the coating onto the bore. The entire bore is thoroughly coated and the cement coating is shown at 13 in FIGURE 5. The coating 13 is then allowed to cure to a substantially dry state.

As shown in FIGURE 3, each conduit section embodies a preformed extruded cylindrical tubular liner 14 formed of a thermoplastic, preferably polyvinylchloride (PVC). At one end of the PVC liner 14, a rather thick cylindrical collar or ring 15 is applied thereto and firmly bonded to the liner with epoxy cement or the like. The ring 15 and the liner proper are in effect integrated at this stage in the manufacturing process. The bonding agent between the ring and liner is allowed to cure or harden. The ring 15 is preferably approximately 1¾ inches in axial length at this time.

The next step in the method involves coating the exterior surface of the liner 14 including the collar or ring 15 with the same epoxy cement previously described and this is indicated at 16 in FIGURE 6. This coating may be accomplished by a dipping operation or by other conventional methods. After thorough coating, the epoxy cement on the liner is allowed to cure or dry.

Following this, the liner 14 and pipe 10 are assembled telescopically as shown in FIGURE 7 until the collar 15 abuts one end of the metal pipe 10. At this time, the liner 14 is approximately .060–.090 inch smaller in outside diameter than the bore of the pipe. This is sufficient for ease of assembly. The end of the liner remote from the collar 15 now should extend about eight inches beyond the adjacent end of the pipe 10, and this condition is shown at 17 in FIGURE 7. At a suitable time prior to assembling the pipe 10 and liner 14, the opposite end portions of the pipe 10 are provided with standard tapered pipe threads 18, as shown.

Referring to FIGURE 8, a coupling sleeve 19 is applied to one screw-threaded end 18 of the pipe 10, adjacent the enlarged collar 15. The coupling sleeve 19 is internally threaded at both ends with tapering standard-type pipe threads 20. The coupling sleeve 19 may now remain permanently attached to the pipe 10, if desired, and may form the coupling member for adjacent male and female conduit sections during the use of the composite conduit produced in accordance with the invention.

The outer end portion of the sleeve 19 now receives temporarily therein a pressure-retaining form or mold member 21 having an inflatable packer 22 secured therein by means of a suitable end wall fitting 23 having an inflation valve 24 which is conventional. As shown in FIGURE 8, the packer 22 has not yet been inflated and there is a space between the packer and the mold 21 and between the packer and the bore of the liner 14. A small annular space also still exists in FIGURE 8 between the liner 14 and the bore of the outer pipe 10.

The other end of pipe 10 now receives over its tapered screw threads 18 a male end mold 25 which is tubular and cylindrical and which receives the approximately eight inches long projecting portion 17 of the liner 14. The mold 25 has a reduced end portion 26 receiving a manual packer 27 which is received in the bore of the liner portion 17 in a pressure-tight manner. The manual packer 27 has an inflation valve 28 through which the entire bore of the liner 14 may be pressurized after the inflatable packer is also expanded or inflated.

Referring to FIGURE 12, the inflatable packer 22 is now inflated to about 125 p.s.i. of pressure to effectively seal the assembly and to apply the necessary internal pressure to the end portion of the thermoplastic liner 14 having the integral collar or ring 15. Following this, the entire bore of the liner 14 is pressurized to approximately 120 p.s.i. through the inflation valve 28 of the manual packer 27, previously described. Compressed air from an external source is utilized for the inflation steps.

While this internal pressure is maintained, the entire assembly is placed in an oven and heated or baked at 225°–250° F. for approximately one hour to one hour and forty-five minutes. The pipe is preferably heated from the longitudinal center outwardly toward its ends. The exact time of heating is determined by the diameter and thickness of the pipe and may vary considerably. The heating will soften the thermoplastic liner 14 and the thermal epoxy cement and cause an intimate fusion or bonding of the liner to the metal pipe bore including a bonding of the collar 15 to the coupling sleeve 19. Also, at the larger diameter portion of the mold 25, the liner extension 17 will be expanded outwardly and formed around the adjacent end of the pipe 10 and bonded thereto so as to form an annular radial flange or lip 29.

At this time, the assembly is removed from the oven and placed bodily in a cooling vat for about ten to twenty minutes, depending upon the size of the pipe to cure and harden the cement and thermoplastic material. The pressure is now relieved through the manual packer 27 and the inflatable packer 22 is deflated and both packers are removed along with the forms or molds 21 and 25. The coupling sleeve 19 remains in place and need not be removed at any time.

The excess liner portion 17 is now removed or trimmed away beyond the flange 29, leaving a clean annular flange 29', as indicated in FIGURE 13. This flange 29' completely covers the adjacent end of the metal pipe 10 for sealing purposes. The remote end of the plastic liner adjacent the thickened collar 15 may be machined back within the coupling sleeve 19 the desired distance, depending upon the type of screw threads and the length of threading, etc. The lined pipe is now ready for use.

FIGURE 13 of the drawings shows a typical coupling or joint between male and female sections of the plastic-lined pipe produced in accordance with the invention method. The coupling sleeve 19 remains attached to the female section and contains the collar portion 15. The opposite end of the sleeve 19 receives the male pipe end having the annular sealing flange 29', which flange directly abuts the opposing end of thickened collar portion 15. The elements 15 and 29' are compressed somewhat axially to provide a fluid-tight seal at their annular meeting faces. As shown in FIGURE 13, the internal diameter of the plastic-lined conduit is constant and uniform at the pipe joint with no recesses or projections so that fluid flow will not be impeded in any way.

Using standard tapered pipe threads on the pipes 10 and sleeve 19 causes a normal gap or separation of approximately one and one-quarter inches between the ends of adjacent pipe sections 10. The axially elongated collar portion 15 is machined so that proper sealing is effected when the pipes 10 are tightened into the fitting 19. In certain prior art arrangements, there remains a gap or recess between the pipe ends inside of the coupling sleeve and this is highly objectionable. In other arrangements, special machining of pipe threads is required as where relatively thin plastic flanges or gaskets are used between the pipe ends instead of the elongated collar 15. In other words, with such prior art structures, standard pipe threads cannot be utilized because of the relatively large gap or space, one and one-quarter inches, between the ends, and much more costly special machining operations are resorted to so that the opposed pipe ends will properly engage the thinner flanges or gasketing. This is an important feature of the present invention, clearly depicted in FIGURE 3.

Additionally, the complete or full bonding of the liner sections 14 to the pipes 10 renders the conduit much stronger and more durable than known prior art arrangements. The liners 14 cannot be displaced during the pipe coupling operation and due to differential expansion or shrinkage of the metal and plastic parts. The bursting strength of the conduit is also significantly increased and leakage is rendered substantially impossible. Other advantages of the invention have been previously detailed. It is now believed that the merits of the invention will be readily apparent to those skilled in the art without any further description.

It is to be understood that the form of the invention herewith shown and described is to be taken as a preferred example of the same and that various changes in the shape, size and arrangement of parts may be resorted to, without departing from the spirit of the invention or scope of the subjoined claims.

We claim:

1. A method of producing lined pipe comprising the steps of applying thermal adhesive to the bore of an outer metal pipe and to the exterior surface of a preformed thermoplastic liner, said liner having a radially enlarged collar portion at one end thereof, assembling the liner with said metal pipe telescopically until the collar portion abuts one end of the metal pipe and causing the opposite end of the liner to project a substantial distance beyond the corresponding end of the metal pipe, applying a coupling sleeve to the end of the metal pipe adjacent to the collar portion and causing said coupling sleeve to surround the collar portion and to project substantially beyond the same axially, applying pressure-retaining forming means to the coupling sleeve and to the remote end of the metal pipe and the portion of the liner which extends beyond the remote end of the pipe, pressurizing the interior of the liner while simultaneously heating the liner and the metal pipe and thereby temporarily softening the liner and adhesive and expanding the liner into full bonded contact with the pipe, cooling the liner and pipe while maintaining internal pressure on the liner, removing said pressure-retaining forming means, and trimming the portion of the liner which projects beyond said corresponding end of the pipe.

2. A method of producing lined pipe in accordance with claim 1, and the additional step of forming the projecting end of the liner around the adjacent metal pipe end during the pressurizing and heating steps to form a permanent radial annular flange on the liner covering the adjacent pipe end, said trimming step removing that portion of the liner extending axially beyond said flange.

3. A method of producing lined pipe in accordance with claim 1, and the additional step of sandblasting the bore of the metal pipe to roughen the bore prior to applying said thermal adhesive to the bore, said preformed thermoplastic liner being an extruded liner, and adhesively bonding said enlarged collar portion as a separately formed element to said one end of the liner prior to assembling the liner with the metal pipe telescopically.

4. A method of producing lined pipe comprising placing a preformed thermoplastic liner through the bore of a metal pipe section and allowing one end of the liner to project a substantial distance axially beyond one end of the pipe section, the other end of the liner having an external enlarged annular collar portion abutting the other end of the pipe section, the pipe section having tapered pipe threads formed externally on its opposite end portions, the bore of the metal pipe section and the periphery of the liner being coated with a heat-sensitive plastic-to-metal bonding agent, applying an internally threaded pipe coupling sleeve over the threaded end of the pipe section adjacent said annular collar portion and over the collar portion so that the coupling sleeve projects axially beyond the collar portion and becomes a permanent attachment to the pipe section and collar portion, plugging the opposite ends of the liner and pressurizing the bore of the liner while heating the liner and metal pipe section and thereby expanding the liner within the pipe section causing bonding of the liner to the pipe section and simultaneously forming a portion of the liner into an annular flange around the end of the pipe section remote from the collar portion, cooling the liner and pipe section while maintaining said pressure, releasing said pressure and plugging means, and trimming off that portion of the liner extending axially beyond said formed flange.

5. A plastic-lined conduit for corrosive liquids and the like comprising a first conduit section, said first section having an exterior metal pipe section, a metal coupling sleeve secured to one end of the metal pipe section and projecting therebeyond, a preformed tubular thermoplastic liner completely bonded to the bore of the metal pipe section and having a smooth bore of constant diameter and including a radially thickened end portion disposed within a central portion of the coupling sleeve and abutting the adjacent end of the metal pipe section and thereby eliminating an annular gap within the coupling sleeve, said thickened end portion being axially elongated and terminating within the bore of the coupling sleeve, a second conduit section having an exterior metal pipe section engaged within the other end of the coupling sleeve and extending therebeyond, and a thermoplastic tubular liner for the last-named metal pipe section completely bonded to the bore of said pipe section and having an axially thin annular radially projecting flange covering the end of the second-named pipe section within the coupling sleeve, said flange being opposed to and abutting the end of the thickened end portion and forming therewith a fluid-tight seal within the coupling sleeve, the bore of the second-named liner being smooth and coinciding with the bore of the first-named liner so as to form a continuous uninterrupted bore through said conduit.

6. In a plastic-lined conduit, as a sub-combination thereof, a metal pipe section having a tapered standard pipe thread on one end thereof, a tubular pipe coupling sleeve permanently assembled onto said one end of the pipe section and projecting substantially therebeyond for receiving a companion lined pipe section, a preformed tubular plastic liner for the first-named pipe section permanently completely bonded to the bore thereof, said liner projecting forwardly of the pipe section within the coupling sleeve and having a radially enlarged annular collar portion within the central portion of the coupling sleeve abutting the adjacent end of the pipe section and filling the central portion of the coupling sleeve adjacent to said end and for a substantial axial distance therebeyond, whereby the companion lined pipe section may have its end abutting said enlarged portion within the coupling sleeve.

7. The invention as set forth in claim 6, and wherein said liner and enlarged portion are formed of a thermoplastic, and a heat-responsive adhesive bonding agent between the liner and the bore of the metal pipe section.

8. A plastic-lined conduit for corrosive liquids and the like comprising a tubular internally threaded pipe coupling member, companion metal pipe sections engaged within opposite end portions of the coupling member with an annular gap of substantial length between the opposed ends of said pipe sections within the central portion of the coupling member, uniform diameter preformed plastic liner sections for said pipe sections adhesively bonded thereto, a thin radial annular flange on the inner end of one liner section covering the adjacent end of the metal pipe section and extending into said gap within the coupling member, and an axially long radially projecting external collar portion on the other liner section covering the adjacent end of the other pipe section and extending into and filling the remainder of the volume of said gap and directly abutting said thin flange to form a liquid-tight seal therewith, whereby the internal diameter of the conduit is smooth and free of projections and recesses.

References Cited

UNITED STATES PATENTS

| | | | |
|---|---|---|---|
| 2,040,766 | 5/1936 | Chappell | 138—143 X |
| 3,050,786 | 8/1962 | John et al. | 138—143 X |
| 3,141,479 | 7/1964 | Mickey | 138—143 |
| 3,254,908 | 6/1966 | Schlosser | 285—149 |
| 3,356,108 | 12/1967 | Johnston | 138—143 |

FOREIGN PATENTS 17,125     1896    Great Britain.

LOUIS K. RIMRODT, *Primary Examiner.*

U.S. Cl. X.R.

285—149